(12) United States Patent
Witte

(10) Patent No.: US 10,690,244 B2
(45) Date of Patent: Jun. 23, 2020

(54) HYDROSTATIC TRANSMISSION WITH OVERSPEED PROTECTION FACILITY

(71) Applicant: Robert Bosch GmbH, Stuttgart (DE)

(72) Inventor: Heiko Witte, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 15/895,163

(22) Filed: Feb. 13, 2018

(65) Prior Publication Data

US 2018/0231122 A1 Aug. 16, 2018

(30) Foreign Application Priority Data

Feb. 14, 2017 (DE) .................. 10 2017 202 275

(51) Int. Cl.
| | |
|---|---|
| *F16H 61/4157* | (2010.01) |
| *F16H 39/10* | (2006.01) |
| *F16H 61/47* | (2010.01) |
| *F16H 61/425* | (2010.01) |
| *F16H 61/435* | (2010.01) |
| *F16H 61/4017* | (2010.01) |

(52) U.S. Cl.
CPC ......... *F16H 61/4157* (2013.01); *F16H 39/10* (2013.01); *F16H 61/4017* (2013.01); *F16H 61/425* (2013.01); *F16H 61/435* (2013.01); *F16H 61/47* (2013.01)

(58) Field of Classification Search
CPC .................................................. F16H 61/4017
See application file for complete search history.

(56) References Cited

U.S. PATENT DOCUMENTS

| | | | | | |
|---|---|---|---|---|---|
| 3,884,039 | A | * | 5/1975 | Pourian | F04B 49/002 60/445 |
| 4,364,230 | A | * | 12/1982 | Holmes | F16H 61/4157 417/217 |
| 4,382,360 | A | * | 5/1983 | Dummer | F16H 61/40 60/444 |
| 4,850,192 | A | * | 7/1989 | Mitsumasa | F16H 61/40 60/468 |
| 6,338,247 | B1 | * | 1/2002 | Drin | B60T 1/093 60/466 |
| 2007/0119163 | A1 | * | 5/2007 | Tatsuno | B60W 30/18072 60/493 |
| 2014/0372000 | A1 | | 12/2014 | Rozycki et al. | |
| 2015/0219213 | A1 | * | 8/2015 | Neumann | F16H 61/20 701/50 |
| 2015/0274149 | A1 | * | 10/2015 | Behm | B60T 1/08 60/327 |

FOREIGN PATENT DOCUMENTS

| | | |
|---|---|---|
| DE | 10 2014 211 393 A1 | 12/2014 |
| EP | 1 960 699 B1 | 5/2011 |

\* cited by examiner

*Primary Examiner* — Thomas E Lazo
*Assistant Examiner* — Matthew Wiblin
(74) *Attorney, Agent, or Firm* — Maginot, Moore & Beck LLP

(57) ABSTRACT

A hydrostatic transmission for a traction drive includes a variable-displacement pump and one or more motors coupled to one another in a closed hydraulic circuit. A braking operation by means of the transmission can be initiated in the traction drive by an electronic control unit if there is a risk of overspeeding of an associated internal combustion engine. The braking operation is initiated if at least two activation thresholds are overshot, of which a first activation threshold is variable whereas the further activation threshold is fixed or variable.

15 Claims, 2 Drawing Sheets

HYDROSTATIC TRANSMISSION WITH OVERSPEED PROTECTION FACILITY

This application claims priority under 35 U.S.C. § 119 to patent application no. DE 10 2017 202 275.2, filed on Feb. 14, 2017 in Germany, the disclosure of which is incorporated herein by reference in its entirety.

The disclosure relates to a hydrostatic transmission with which a hydrostatic braking operation is possible, and which has an overspeed protection facility for an internal combustion engine coupled to the transmission.

BACKGROUND

The prior art has disclosed hydrostatic transmissions for mobile working machines in which a hydrostatic pump (primary unit) and a hydrostatic motor (secondary unit) are fluidically connected to one another by means of a closed circuit. An internal combustion engine, for example a diesel engine of the mobile working machine, is coupled rotationally conjointly to the primary unit, and an output, for example an axle or a wheel of the mobile working machine, is coupled rotationally conjointly to the secondary unit. The mobile working machine thus has a traction drive which has a hydrostatic transmission.

The document EP 1 960 699 B1 discloses a hydrostatic transmission, with which braking can also be performed. Here, in relation to traction operation, the power flows in the reverse direction from the output, via the secondary unit acting as a pump and via the primary unit acting as a motor, to the internal combustion engine, which is then driven in a passive cranking operating mode. The highly pressurized working line of the closed circuit is in this case safeguarded by means of a pressure-limiting valve, by means of which, too, a part of the braking power can be dissipated during the braking operation. In the case of said solution, however, the braking operation is triggered only when the driver explicitly expresses the demand by means of an actuation of the brake pedal. The driver must therefore also actuate the brake pedal in order to avoid excessively high rotational speeds of the internal combustion engine.

The documents DE 10 2014 211 393 A1 and US 2014/0372000 A1 each disclose a hydrostatic transmission, wherein it is sought to protect the internal combustion engine against overspeeding. For this purpose, a speed control system is described which identifies an overshooting of the braking power of the internal combustion engine and thereupon automatically triggers a high-power braking operation. A part of the braking power is output to the internal combustion engine, whereas another part of the braking power is converted by means of the pressure-limiting valve of the high-pressure line in question into heat. Here, a combination of the actual rotational speed of the internal combustion engine and a further signal, such as a rotational speed deviation and a speed deviation, are used. A disadvantage of this hydrostatic transmission is that situations arise in which it is not sufficient to protect the internal combustion engine on the basis of the described criteria. Furthermore, the transmission does not take into consideration the large differences that can exist between the various mobile working machines in question.

Furthermore, from the prior art, a hydrostatic transmission is known which, in the event of an overshooting of a rotational speed threshold or of an activation threshold of the rotational speed of the internal combustion engine, triggers a high-power braking operation by virtue of the primary unit being pivoted back. Thus, although the internal combustion engine is protected, its possible braking power is not optimally utilized.

By contrast, it is the object of the disclosure to provide a hydrostatic transmission in the case of which, during a braking operation, the internal combustion engine is reliably protected against overspeeding and at the same time discharges or dissipates the maximum possible braking power.

Said object is achieved by means of a hydrostatic transmission having the features disclosed herein.

SUMMARY

The claimed hydrostatic transmission is provided for a traction drive which has an internal combustion engine, for example a diesel engine, and an output, for example a wheel or an axle. The hydrostatic transmission has a driveshaft, which is couplable to the internal combustion engine of the traction drive and which operates as a pump during traction operation, of a primary unit, and a secondary unit, which is couplable to the output of the traction drive, or multiple secondary units which are connected hydraulically in parallel, which operate as motor(s) during traction operation. The two units are fluidically connected to one another by means of two working lines of a closed circuit. The primary unit has an adjustable pivot angle and thus an adjustable swept volume, which pivot angle or swept volume is controllable by an electrical control unit during a braking operation of the hydrostatic transmission. A braking operation is automatically initiated by the control unit if an actual rotational speed of the internal combustion engine or a value derived from the former, for example an actual rotational speed of the primary unit, reaches or overshoots a first activation threshold or an activation threshold derived from the former, for example a rotational speed of the primary unit, and if a further actual value additionally also reaches or overshoots a further activation threshold. The first activation threshold is always greater, by a particular added-on value or offset, than a setpoint rotational speed of the internal combustion engine or than a value derived from the former, for example than a setpoint rotational speed of the primary unit. Thus, the first activation threshold is variable and is always adapted to the present operating situation of the internal combustion engine. By means of the further activation threshold and by means of the interaction of the two activation thresholds, the internal combustion engine can be protected against overspeeding in a flexible and reliable manner, and can at the same time dissipate the maximum possible braking power. Furthermore, the hydrostatic transmission according to the disclosure can be flexibly adapted to different mobile working machines and to different braking operations.

If the setpoint rotational speed is adjustable by means of a driver demand, in particular by means of an operating element, for example by means of a brake pedal or else by means of an accelerator pedal or an accelerator lever or by means of an automatic speed controller, the foresight of the driver can be advantageously utilized. For example, the first activation threshold is indirectly reduced by the driver if he or she predefines a reduction in a setpoint rotational speed, and vice versa.

According to a first refinement, the further activation threshold is a fixed rotational speed of the internal combustion engine or a fixed activation threshold derived from the former.

According to a second refinement, the further activation threshold is a fixed acceleration of the internal combustion engine or a fixed activation threshold derived from the former.

According to a third refinement, the further activation threshold is a variable or adjustable activation threshold of the rotational speed or an activation threshold derived from the former, which is dependent on an actual traveling speed of the mobile working machine or on a value derived from the former, for example an actual rotational speed of the secondary unit.

A refinement is particularly preferred in which the three abovementioned activation thresholds are stored or calculated in the control unit simultaneously. Thus, the braking operation is automatically initiated by the control unit if—aside from the first activation threshold—at least also one of the following (abovementioned) further activation thresholds is reached or overshot:

the fixed activation threshold of the rotational speed of the internal combustion engine or the activation threshold derived from the former, or the fixed activation threshold of the acceleration of the internal combustion engine or the activation threshold derived from the former, or the variable or adjustable activation threshold of the rotational speed, or the activation threshold derived from the former, which is dependent on the actual traveling speed of the mobile working machine or on the value derived from the former.

The further variable or adjustable activation threshold of the rotational speed or the activation threshold derived from the former is preferably lower than or equal to the further fixed activation threshold of the rotational speed or the activation threshold derived from the former.

The further variable or adjustable activation threshold of the rotational speed or the activation threshold derived from the former is set by the control unit to be equal to the further fixed activation threshold of the rotational speed, or to the activation threshold derived from the former, if the actual traveling speed of the mobile working machine or the value derived from the former is lower than or equal to a setpoint traveling speed or a value derived from the former, and said further variable or adjustable activation threshold of the rotational speed or the activation threshold derived from the former is set to be lower than the further fixed activation threshold of the rotational speed if the actual traveling speed or the value derived from the former is higher than the setpoint traveling speed of the mobile working machine or than the value derived from the former.

It is preferable if the braking operation is also automatically ended by the control unit in the event of a decrease of the actual rotational speed of the internal combustion engine or of the value derived from the former below a deactivation threshold of the rotational speed or below a deactivation threshold derived from the former, for example a deactivation threshold of the rotational speed of the primary unit. The deactivation threshold may be dependent on the mobile working machine.

The derived activation thresholds and derived values frequently mentioned in this document are in particular equal or proportional to the respective aforementioned activation threshold or to the aforementioned value. This is possible for example if the two relevant activation thresholds of a rotational speed are coupled by means of a unipartite shaft, or if they are coupled rotationally conjointly to one another by means of a mechanical transmission. For example, it is possible for the rotational speed thresholds and the crankshaft of the internal combustion engine (which does not belong to the claimed transmission) to be derived from the driveshaft, coupled to said internal combustion engine, of the primary unit (of the claimed transmission).

To permit a high-power braking operation, it is particularly preferable if in each case one pressure-limiting valve is arranged on both working lines. A first part of the braking power can be dissipated via the pressure-limiting valve involved in the braking operation, whereas a second part of the braking power can be dissipated via the primary unit and via the internal combustion engine. The braking power that can be realized is particularly high if the first part is greater than the second part.

If, during the high-power braking operation, the volume flow via the primary unit increases, the volume flow via the related pressure-limiting valve decreases. Thus, the pressure in the working line at high pressure can fall. To minimize this pressure reduction or to keep the pressure approximately constant, pressure-limiting valves are preferred which have a flat characteristic curve with regard to their pressure difference as a function of their passed-through volume flow.

In a preferred refinement of the hydrostatic transmission according to the disclosure, the pivot angle and the swept volume of the primary unit are adjustable in both directions from a zero position. The traction drive in question can thus, with a constant direction of rotation of the internal combustion engine, be utilized in traction operation in both directions of travel of the mobile working machine, and can correspondingly be braked (with high-power action) according to the disclosure in both directions.

If the secondary unit also has an adjustable pivot angle and thus an adjustable swept volume, which pivot angle or swept volume is controllable by the control unit during the braking operation, it is furthermore possible for a braking torque to be adjusted during the braking operation.

The braking torque is preferably variable or adjustable during the braking operation, in particular in a manner dependent on the operating element, that is to say on the driver demand.

An exemplary embodiment of the transmission according to the disclosure is illustrated in the drawings. The disclosure will now be discussed in more detail on the basis of the figures of said drawings.

DETAILED DESCRIPTION

Figure 1:
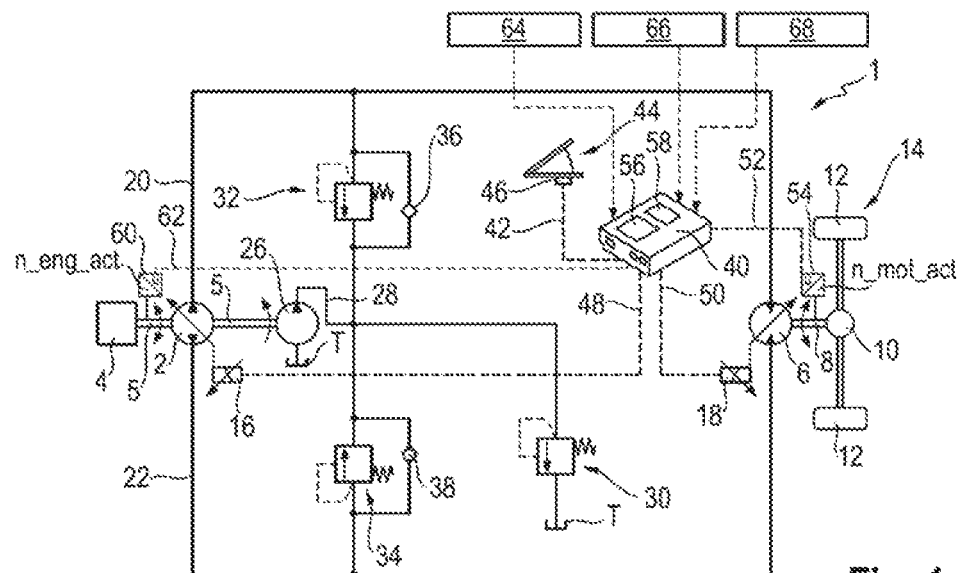
FIG. 1 shows a hydraulic and electrical schematic diagram of a traction drive having a hydrostatic transmission according to the disclosure as per the exemplary embodiment.

According to FIG. 1, a hydrostatic traction drive of a mobile working machine (not shown in any more detail) (for example wheeled loader, telehandler, combine harvester or field harvester) has a hydrostatic transmission 1 according to the disclosure. The transmission 1 has a hydrostatic primary unit 2 which is operated primarily as a hydraulic pump and which is driven by an internal combustion engine 4, designed as a diesel engine, of the traction drive via a driveshaft 5. Furthermore, the transmission 1 has a hydrostatic secondary unit 6, which is coupled via a driveshaft 8 to an axle 14, which has two wheels 12, of the traction drive and which is operated primarily as a hydraulic motor. More specifically, the driveshaft 8 is coupled to a differential transmission 10 of the axle 14.

Both hydraulic machines 2, 6 are adjustable in terms of their swept volume Vg_pump, Vg_mot by means of a respective adjustment device 16, 18. The first hydraulic machine 2 is fluidically connected to the secondary unit 6 in a closed hydraulic circuit via a first working line 20, which in the further explanations is the feed line and via which pressure medium flows from the primary unit 2 to the secondary unit 6, and via a second working line 22, which in the further explanations is the return line and via which pressure medium flows from the secondary unit 6 to the primary unit 2.

The hydrostatic transmission 1 has a feed pump 26 which is connected to the driveshaft 5 of the primary unit 2 and which can deliver pressure medium from a tank T into a feed line 28. The latter branches into three branches, wherein a first branch can be placed in pressure-medium-conducting connection with the tank T via a pressure-limiting valve 30. A second and a third branch can be connected in pressure-medium-conducting fashion via a respective pressure-limiting valve 32, 34, of which each has an integrated replenishment check valve 36, 38, to the branch line 20 and to the branch line 22 respectively.

Both units 2, 6 are operable in all four quadrants, such that both the flow direction of the pressure medium in the closed hydraulic circuit and the direction of rotation of each of the units 2, 6 is reversible.

The hydrostatic transmission 1 has a control unit 40, to which a brake pedal 44 is connected via a signal line 42. The brake pedal 44 has a sensor 46 by means of which an actuation intensity of the brake pedal 44 can be detected and transmitted via the signal line 42 to the control unit 40. The latter is connected via an electrical signal line 48 to the adjustment device 16 of the primary unit 2 and via an electrical signal line 50 to the adjustment device 18 of the secondary unit 6.

Via an electrical signal line 52, a rotational speed detection unit 54 by means of which an actual rotational speed n_mot_act of the secondary unit 6 can be detected at the driveshaft 8 is connected to the control unit 40. Via an electrical signal line 62, a rotational speed detection unit 60 by means of which an actual rotational speed n_pump_act of the primary unit 2 can be detected at its driveshaft 5 is connected to the control unit 40. Owing to the fact that the driveshaft 5 is formed in one piece with a crankshaft of the internal combustion engine 4 that is to be protected against overspeeding, an actual rotational speed n_eng_act of the internal combustion engine 4, which is to be limited, is also detected by means of the rotational speed detection unit 60.

During the high-power braking operation by means of the hydrostatic transmission 1 according to the disclosure, the axle 14 is supported, via the driveshaft 8 and via the secondary unit 6 operating as a pump and via one of the two working lines 22 and via the primary unit 2 operating as a motor and via the driveshaft 5 of the primary unit 2, on the internal combustion engine 4, which is then cranked and, by means of its friction and acceleration forces of the pistons, dissipates at least a part of the braking energy of the mobile working machine.

Furthermore, an automatic speed controller 64, an accelerator pedal 66 and an accelerator lever 68 are electrically connected via respective signal lines to the control unit 40.

During the operation of the hydrostatic transmission 1 according to the disclosure, the control unit 40 calculates a setpoint rotational speed n_mot_des of the driveshaft 8 of the secondary unit 2 from the setting of the automatic speed controller 64 or the position of the accelerator pedal 66 or of the accelerator lever 68, which all constitute a driver demand, because said setpoint rotational speed is proportional to the setpoint traveling speed v_veh_des of the mobile working machine in question. Correspondingly, the actual traveling speed v_veh_act is inferred from the actual rotational speed n_mot_act of the secondary unit 6.

The control unit 40 has a memory unit 56, in which two fixed activation thresholds n_eng_on, α_eng_on are stored, and a processor unit 58, in which two variable activation thresholds n_eng_on_min, n_eng_on_v_veh are calculated and which automatically initiates and executes the high-power braking operation in a manner dependent on all four activation thresholds n_eng_on_min, n_eng_on, n_eng_on_v_veh, α_eng_on.

Figure 2:
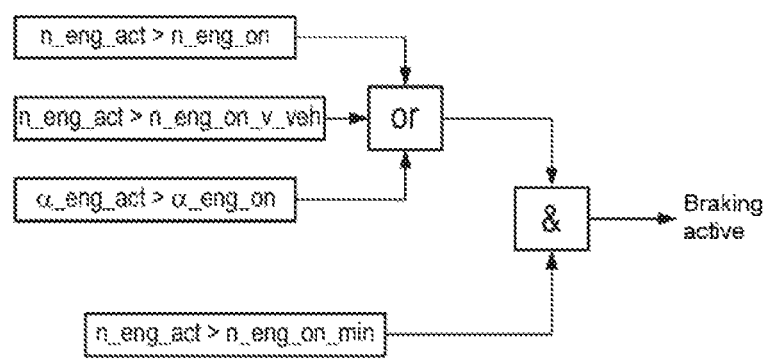
FIG. 2 shows a diagram of the different activation thresholds of the transmission from FIG. 1.

FIG. 2 shows the interaction of the four different activation thresholds n_eng_on_min, n_eng_on, n_eng_on_v_veh, α_eng_on. Illustrated at the bottom in FIG. 2 is the first activation threshold n_eng_on_min, which must in any case be overshot by the actual rotational speed n_eng_act of the internal combustion engine 4 in order for the high-power braking operation to be automatically triggered. Here, the first activation threshold n_eng_on_min is always greater than the setpoint rotational speed n_eng_des by a particular added-on value or offset.

Also illustrated in FIG. 2 are the three further activation thresholds n_eng_on, n_eng_on_v_veh, α_eng_on, of which one activation threshold must be overshot in order for the high-power braking operation to be triggered. More specifically, in addition to the abovementioned first activation threshold n_eng_on_min, either the actual rotational speed n_eng_act of the crankshaft of the internal combustion engine 4 must overshoot the fixed rotational speed threshold n_eng_on or the variable rotational speed threshold n_eng_on_v_veh, or the acceleration α_eng_act of the crankshaft of the internal combustion engine 4 exceeds the acceleration threshold α_eng_on. Here, the variable rotational speed threshold n_eng_on_v_veh is calculated in a manner dependent on the actual traveling speed v_veh_act and the setpoint traveling speed v_veh_des of the mobile working machine in question as follows:

$$v\_veh\_act \leq v\_veh\_des \rightarrow n\_eng\_on\_v\_veh = n\_eng\_on$$

$$v\_veh\_act > v\_veh\_des \rightarrow n\_eng\_on\_v\_veh = 0.9 \cdot n\_eng\_on$$

The further activation threshold n_eng_on_min has the task of preventing high-power braking in the following two situations if such braking is not yet required in order to protect the internal combustion engine against overspeeding:

1.) during on-road travel with a relatively low actual rotational speed n_eng_act at which the internal combustion engine 4 still has an adequate upward rotational speed reserve. It is sought to prevent the high-power braking operation being triggered in the presence of a high actual acceleration α_eng_act of the internal combustion engine 4 (α_eng_act>α_eng_on) even though the actual rotational speeds n_eng_act are not critical.

2.) during working operation in which the internal combustion engine 4, for example of a combine harvester or field harvester, has very high working constant rotational speeds $n\_eng\_act$. Here, no high-power braking is required because the actual traveling speed $v\_veh\_act$ is relatively low, and because the internal combustion engine 4 is additionally loaded by consumers, such as for example threshing mechanism, infeed or grain separator. When said consumers are deactivated, the internal combustion engine 4 is relieved of load, such that the actual rotational speed $n\_eng\_act$ briefly increases somewhat until it is reduced again by a closed-loop rotational speed controller. Since said high working constant rotational speeds $n\_eng\_act$ already lie very close to the additional activation threshold $n\_eng\_on$, it may be the case that, in the load relief situation, said activation threshold is overshot despite no high-power braking being required. For this reason, the additional activation threshold $n\_eng\_on\_min$ is variable and has a fixed added-on value or offset with respect to the setpoint rotational speed $n\_eng\_des$.

In a first operating situation, the setpoint rotational speed $n\_eng\_des$ is 1500 rpm, and the added-on value is 150 rpm, such that the first activation threshold $n\_eng\_on\_min$ is 1650 rpm. The further activation threshold $n\_eng\_on$ is 2100 rpm and is thus higher than the first. Thus, the high-power braking operation is triggered only if the further activation threshold $n\_eng\_on$ of 2100 rpm is overshot.

In a second operating situation, the setpoint rotational speed $n\_eng\_des$ is 2000 rpm. In the case of the added-on value of 150 rpm, the resulting first activation threshold $n\_eng\_on\_min$ is 2150 rpm. Thus, the further activation threshold $n\_eng\_on$ of 2100 rpm is somewhat lower than the first. Thus, the high-power braking operation is triggered only if the first activation threshold $n\_eng\_on\_min$ of 2150 rpm is overshot.

The example shows that the first activation threshold $n\_eng\_on\_min$ (despite its name or reference designation) is not always the lower activation threshold.

Figure 3:
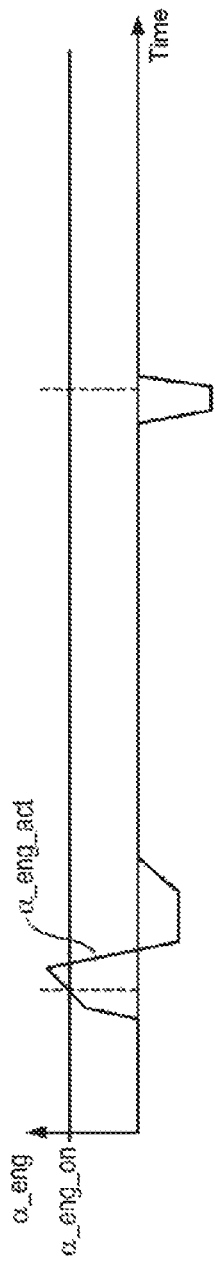
FIG. 3 shows a diagram of the acceleration of the internal combustion engine and thus of the primary unit of the hydrostatic transmission from FIG. 1.
Figure 4:
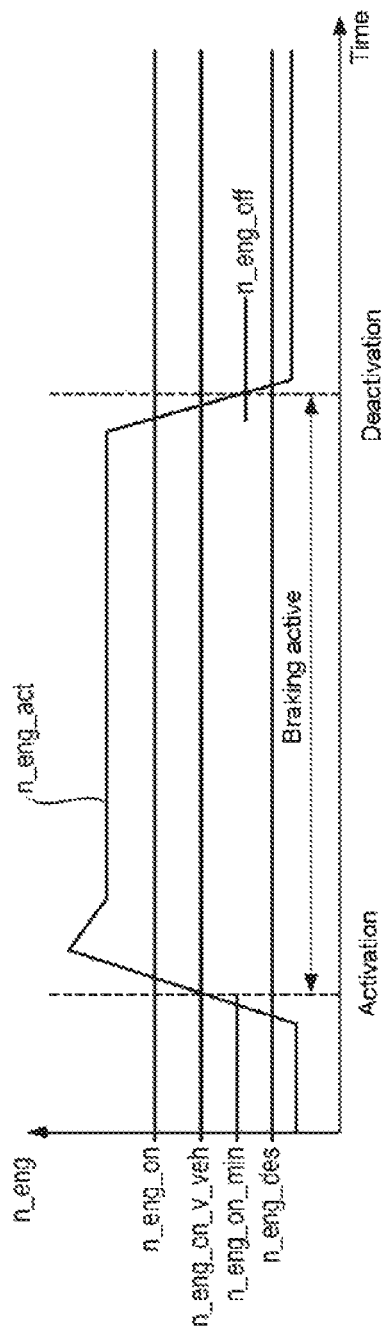
FIG. 4 shows a diagram of the rotational speeds of the internal combustion engine and thus of the primary unit of the hydrostatic transmission from FIG. 1.

FIGS. 3 and 4 show, in each case in a profile with respect to time, further examples of the activation thresholds and of the deactivation threshold. The figures each show firstly an activation, that is to say the automatic initiation of the high-power braking operation, and subsequently a deactivation, that is to say the automatic ending of the high-power braking operation.

FIG. 3 shows the further fixed activation threshold of the acceleration $\alpha\_eng\_on$ and an exemplary profile of the actual acceleration $\alpha\_eng\_act$ of the crankshaft of the internal combustion engine 4. If the actual rotational speed $n\_eng\_act$ overshoots the first activation threshold $n\_eng\_on\_min$ (cf. FIG. 4) and, as per FIG. 3, the actual acceleration $\alpha\_eng\_act$ overshoots the activation threshold $\alpha\_eng\_on$, the high-power braking operation is triggered.

FIG. 4 shows the different rotational speeds $n\_eng$ in relation to one another. In addition to the setpoint rotational speed $n\_eng\_des$, an exemplary profile of the actual rotational speed $n\_eng\_act$ is shown, along with the various rotational speed thresholds. More specifically, the first fixed activation threshold $n\_eng\_on\_min$ and the further variable activation threshold $n\_eng\_on\_v\_veh$ and the further fixed activation threshold $n\_eng\_on$ and the deactivation threshold $n\_eng\_off$ are shown. It can be seen that the high-power braking operation is triggered after an overshooting of the fixed activation threshold $n\_eng\_on\_min$ and additionally when the further variable activation threshold $n\_eng\_on\_v\_veh$ is reached, and said high-power braking operation is performed until the actual rotational speed $n\_eng\_act$ falls to the deactivation threshold $n\_eng\_off$.

A hydrostatic transmission for a traction drive is disclosed, wherein a variable-displacement pump and one or more motors are coupled to one another in a closed hydraulic circuit. A braking operation by means of the transmission can be initiated in the traction drive by an electronic control unit if there is a risk of overspeeding of the internal combustion engine. The braking operation is initiated if at least two activation thresholds are overshot, of which a first activation threshold is variable whereas the further activation threshold is fixed or variable.

LIST OF REFERENCE DESIGNATIONS

1 Hydrostatic transmission
2 Primary unit
4 Internal combustion engine
5 Driveshaft
6 Secondary unit
8 Driveshaft
10 Differential transmission
12 Wheel
14 Output/axle
16 Adjustment device
18 Adjustment device
20 Working line
22 Working line
26 Feed pump
28 Feed line
30 Pressure-limiting valve
32 Pressure-limiting valve
34 Pressure-limiting valve
36 Replenishment check valve
38 Replenishment check valve
40 Control unit
42 Signal line
44 Brake pedal
46 Sensor
48 Signal line
50 Signal line
52 Signal line
54 Rotational speed detection unit
56 Memory unit
58 Processor unit
60 Rotational speed detection unit
62 Signal line
64 Automatic speed controller
66 Accelerator pedal
68 Accelerator lever
$n\_eng\_act$ Actual rotational speed of the internal combustion engine
$n\_eng\_des$ Setpoint rotational speed of the internal combustion engine
$n\_eng\_off$ Deactivation threshold (rotational speed of the internal combustion engine)
$n\_eng\_on$ Further activation threshold (rotational speed of the internal combustion engine)
$n\_eng\_on\_min$ First activation threshold (rotational speed of the internal combustion engine)
$n\_eng\_on\_v\_veh$ Further activation threshold (rotational speed of the internal combustion engine)
$n\_mot\_act$ Actual rotational speed of the secondary unit
$n\_pump\_act$ Actual rotational speed of the primary unit
$n\_pump\_des$ Setpoint rotational speed of the primary unit
$n\_pump\_off$ Deactivation threshold (rotational speed of the primary unit)
$n\_pump\_on$ Derived further activation threshold (rotational speed of the primary unit)

n_pump_on_min Derived first activation threshold (rotational speed of the primary unit)
n_pump_on_v_veh Derived further activation threshold (rotational speed of the primary unit)
Vg_mot Swept volume of the secondary unit
Vg_pump Swept volume of the primary unit
v_veh_act Actual traveling speed
v_veh_des Setpoint traveling speed
α_eng_act Actual acceleration of the internal combustion engine
α_eng_on Further activation threshold (acceleration of the internal combustion engine)
α_pump_on Further activation threshold (acceleration of the primary unit)
T Tank

What is claimed is:

1. A hydrostatic transmission for a traction drive of a mobile working machine, comprising:
   a primary unit including a driveshaft coupled to an internal combustion engine of the traction drive;
   a secondary unit coupled to an output of the traction drive;
   two working lines of a closed circuit, each one of the two working lines configured to fluidically connect the primary unit and the secondary unit; and
   an electrical control unit configured to control an adjustable pivot angle or an adjustable swept volume of the primary unit during a braking operation of the hydrostatic transmission, the electrical control unit configured to automatically initiate the braking operation in response to detecting both of the following:
   an actual rotational speed of the internal combustion engine or a derived rotational speed derived from the actual rotational speed reaching or overshooting a first activation threshold; and
   at least one further actual value or at least one derived further actual value derived from the at least one further actual value reaching or overshooting at least one further activation threshold,
   wherein the first activation threshold is greater than a setpoint rotational speed of the internal combustion engine or a derived setpoint rotational speed value derived from the setpoint rotational speed by a predetermined value.

2. The hydrostatic transmission according to claim 1, further comprising:
   a user-controlled operating element configured to adjust the setpoint rotational speed or the derived setpoint rotational speed.

3. The hydrostatic transmission according to claim 1, wherein the at least one further activation threshold is a fixed value.

4. The hydrostatic transmission according to claim 3, wherein the fixed value of the at least one further activation threshold is a threshold rotational speed of the internal combustion engine or a derived threshold rotational speed derived from the threshold rotational speed.

5. The hydrostatic transmission according to claim 3, wherein the fixed value of the at least one further activation threshold is a threshold acceleration of the internal combustion engine or a derived threshold acceleration derived from the derived acceleration.

6. The hydrostatic transmission according to claim 1, wherein the at least one further activation threshold is a variable or adjustable value of the rotational speed or a variable derived from the rotational speed, the variable or adjustable value being dependent on an actual traveling speed of the mobile working machine or on a derived value derived from the actual traveling speed.

7. The hydrostatic transmission according to claim 1, wherein:
   the electrical control unit is configured to simultaneously store or calculate, as the at least one further activation threshold, a first further activation threshold, a second further activation threshold, and a third further activation threshold, and to automatically initiate the braking operation in response to detecting reaching or overshooting of the first activation threshold and reaching or overshooting of at least one of the first, second, and third further activation thresholds,
   the first further activation threshold is a fixed value of the rotational speed of the internal combustion engine or a derived fixed value derived from the rotational speed,
   the second further activation threshold is a fixed value of an acceleration of the internal combustion engine or a derived fixed value derived from the acceleration, and
   the third further activation threshold is a variable or adjustable value of the rotational speed or of a variable derived from the rotational speed, the variable or adjustable value being dependent on an actual traveling speed of the mobile working machine or on a derived value derived from the actual traveling speed.

8. The hydrostatic transmission according to claim 7, wherein the third further activation threshold is less than or equal to the first further activation threshold.

9. The hydrostatic transmission according to claim 8, wherein:
   the electrical control unit is configured to set the third further activation threshold to be equal to the first further activation threshold if the actual traveling speed of the mobile working machine or the derived value derived from the actual traveling speed is less than or equal to a setpoint traveling speed of the mobile working machine or a derived setpoint traveling speed value derived from the setpoint traveling speed, and
   the electrical control unit is configured to set the third further activation threshold to be less than the first further activation threshold if the actual traveling speed of the mobile working machine or the derived value derived from the actual traveling speed is greater than the setpoint traveling speed of the mobile working machine or the derived setpoint traveling speed value.

10. The hydrostatic transmission according to claim 1, wherein the controller is further configured to automatically terminate the braking operation in response to the actual rotational speed of the internal combustion engine or the derived rotational speed derived from the actual rotational speed falling below a deactivation threshold of the rotational speed or a derived deactivation threshold derived from the deactivation threshold.

11. The hydrostatic transmission according to claim 1, further comprising:
    a first pressure-limiting valve arranged on a first working line of the two working lines; and
    a second pressure-limiting valve arranged on a second working line of the two working lines,
    wherein the braking operation is a high-power braking operation in which a first part of the braking power is dissipated via one of the first and the second pressure-limiting valves, while a second part of the braking power is dissipated via the primary unit.

12. The hydrostatic transmission according to claim 11, wherein the first and the second pressure-limiting valves each have a flat characteristic curve of pressure difference as a function of passed-through volume flow.

13. The hydrostatic transmission according to claim 1, wherein the pivot angle and the swept volume of the primary unit are adjustable in both directions from a zero position.

14. The hydrostatic transmission according to claim 1, wherein the secondary unit has an adjustable pivot angle or an adjustable swept volume, and the electrical control unit is configured to control the adjustable pivot angle or adjustable swept volume during the braking operation.

15. The hydrostatic transmission according to claim 1, wherein a braking torque is variable or adjustable during the braking operation.

* * * * *